United States Patent
Poteet et al.

(10) Patent No.: US 9,614,355 B2
(45) Date of Patent: Apr. 4, 2017

(54) PORTABLE ELECTRICAL SUBSTATION RACKING MECHANISM

(71) Applicant: Delta Star, Inc., Lynchburg, VA (US)

(72) Inventors: Kenneth D. Poteet, Appomattox, VA (US); Fernando Maestrini, Menlo Park, CA (US)

(73) Assignee: Delta Star, Inc., Lynchburg, VA (US)

( * ) Notice: Subject to any disclaimer, the term of this patent is extended or adjusted under 35 U.S.C. 154(b) by 134 days.

(21) Appl. No.: 14/798,918

(22) Filed: Jul. 14, 2015

(65) Prior Publication Data

US 2016/0020585 A1 Jan. 21, 2016

Related U.S. Application Data

(60) Provisional application No. 62/024,575, filed on Jul. 15, 2014.

(51) Int. Cl.
*H02B 1/04* (2006.01)
*F16M 11/20* (2006.01)
*H02B 5/00* (2006.01)
*H02B 1/52* (2006.01)

(52) U.S. Cl.
CPC ........... *H02B 1/04* (2013.01); *F16M 11/2085* (2013.01); *H02B 1/52* (2013.01); *H02B 5/00* (2013.01)

(58) Field of Classification Search
CPC ..... H02B 1/04; H02B 5/00–5/02; H02B 7/00; H02B 7/06–7/08; F16M 11/2085
See application file for complete search history.

(56) References Cited

U.S. PATENT DOCUMENTS

| | | | | |
|---|---|---|---|---|
| 2,557,484 A * | 6/1951 | Wagner | ................... | B66C 13/56 212/246 |
| 4,081,095 A * | 3/1978 | Wilburn | ................... | B60R 9/042 414/462 |
| 4,909,558 A * | 3/1990 | Roshinsky | ............. | B60R 13/01 296/37.6 |
| 6,871,897 B1 * | 3/2005 | Snyder | ..................... | B60P 3/34 296/165 |
| 7,328,810 B1 * | 2/2008 | Rhodes | ................... | B66C 23/80 212/180 |
| 8,441,778 B1 * | 5/2013 | Ashmore | ................ | H02B 5/00 307/113 |
| 8,684,444 B2 * | 4/2014 | Dao | ........................ | B60J 11/02 296/136.01 |
| D738,936 S * | 9/2015 | Kameyama | .................... | D15/28 |
| 2005/0274278 A1 * | 12/2005 | Thieltges | ............... | G03B 15/00 104/292 |

FOREIGN PATENT DOCUMENTS

JP 59181906 U * 12/1984
JP 59181907 U * 12/1984

* cited by examiner

*Primary Examiner* — Robert J Hoffberg
(74) *Attorney, Agent, or Firm* — Stradley Ronon Stevens & Young LLP

(57) ABSTRACT

A racking mechanism for moving elements of a mobile electrical substation between a transport mode and an operational mode is provided. The racking mechanism includes a fixed structural member; a moveable structural member; and a bearing disposed between a side surface of the fixed structural member and a side surface of the moveable structural member.

18 Claims, 10 Drawing Sheets

PORTABLE ELECTRICAL SUBSTATION RACKING MECHANISM

RELATED APPLICATION

This application claims the benefit of priority to U.S. Provisional Patent Application Ser. No. 62/024,575, filed Jul. 15, 2014, the contents of which are incorporated in this application by reference.

FIELD

The present invention relates to portable electrical substations, and more particularly, to improved racking mechanisms for use in connection with portable electrical substations.

BACKGROUND

Mobile electrical substations (also known as "mobiles") may be used in place of distribution or transmission substations (e.g., in emergency situations, or for maintenance/construction purposes, etc.). The use of such mobile electrical substations involves certain challenges such as dimensional and weight restrictions. More specifically, such mobile electrical substations are transported on roads, where local and federal codes define limits in regard to weight and dimensions. In the technical specifications, the design of such mobile electrical substations is driven largely by power (e.g., MVA) and the voltage level (e.g., kV). In regard to dimensions, height is a key concern. There are two main modes for a mobile electrical substation: transport mode; and operational mode. In transport mode, the mobile electrical substation is configured to meet the imposed dimensional road limits. During operational mode, the spacing between some components (e.g., the switchgear in a three phase mobile substation) is increased for dielectric distance requirements due to high voltage. A critical part of this change between the transport mode and the operational mode is the racking mechanism. The racking mechanism moves components of the mobile electrical substation (e.g., high voltage switchgear components) into the configuration desired for the operational mode.

There are different types of conventional racking mechanisms in use. They can mainly be categorized into a draw out style, and a pivoting style. Both of these styles use three main components: (1) a movable structural member; (2) a fixed structural member; and (3) bearings to enable the movable structural member to assume different positions between the transport mode and the operational mode. The pivoting style (which is often used for higher kV applications) has complex features, and presents challenges in the design of the pivoting point and fixture into the desired position. The draw out style (illustrated in FIG. 11) usually employs bearings below and above the movable structural member, such that the fixed structural member envelops the moveable structural member and the bearings. FIG. 11 illustrates an example of a prior art racking system 10 including: first support platform 12 engaged with first moveable member 12a which moves with respect to first fixed member 12b; stationary platform 14; and second support platform 16 engaged with second moveable member 16a which moves with respect to second fixed member 16b. A relatively large number of bearings 16c are provided above and below the respective moveable members (e.g., moveable member 16a), resulting in the challenges recited herein.

Due to constraints in the height of the mobile electrical substation, smaller bearings are often utilized, thereby resulting in a higher number of bearings being used. The bearings are usually directly mounted to the enveloping fixed structural member involving special, high precision threads. Due to the complexity, and the amount of material used, certain of the components are often formed from a lighter, but more expensive, material such as aluminum. This adds further complexity to the design.

Thus, it would be desirable to provide improved racking mechanisms for mobile electrical substations overcoming one or more of the deficiencies of conventional racking mechanisms.

SUMMARY

According to an exemplary embodiment of the present invention, a racking mechanism for moving elements of a mobile electrical substation between a transport mode and an operational mode is provided. The racking mechanism includes a fixed structural member; a moveable structural member; and a bearing disposed between a side surface of the fixed structural member and a side surface of the moveable structural member.

According to another exemplary embodiment of the present invention, a multi-phase racking mechanism for moving elements of a multi-phase mobile electrical substation between a transport mode and an operational mode is provided. The multi-phase racking mechanism includes a plurality of fixed structural members; a plurality of moveable structural members, each of the moveable structural members being engaged with a corresponding one of the fixed structural members; and a plurality of bearings disposed between side surfaces of each of the fixed structural members and side surfaces of a corresponding one of the moveable structural members.

BRIEF DESCRIPTION OF THE DRAWINGS

The invention is best understood from the following detailed description when read in connection with the accompanying drawings. It is emphasized that, according to common practice, the various features of the drawings are not to scale. On the contrary, the dimensions of the various features are arbitrarily expanded or reduced for clarity. Included in the drawings are the following figures.

DETAILED DESCRIPTION

Figure 1:
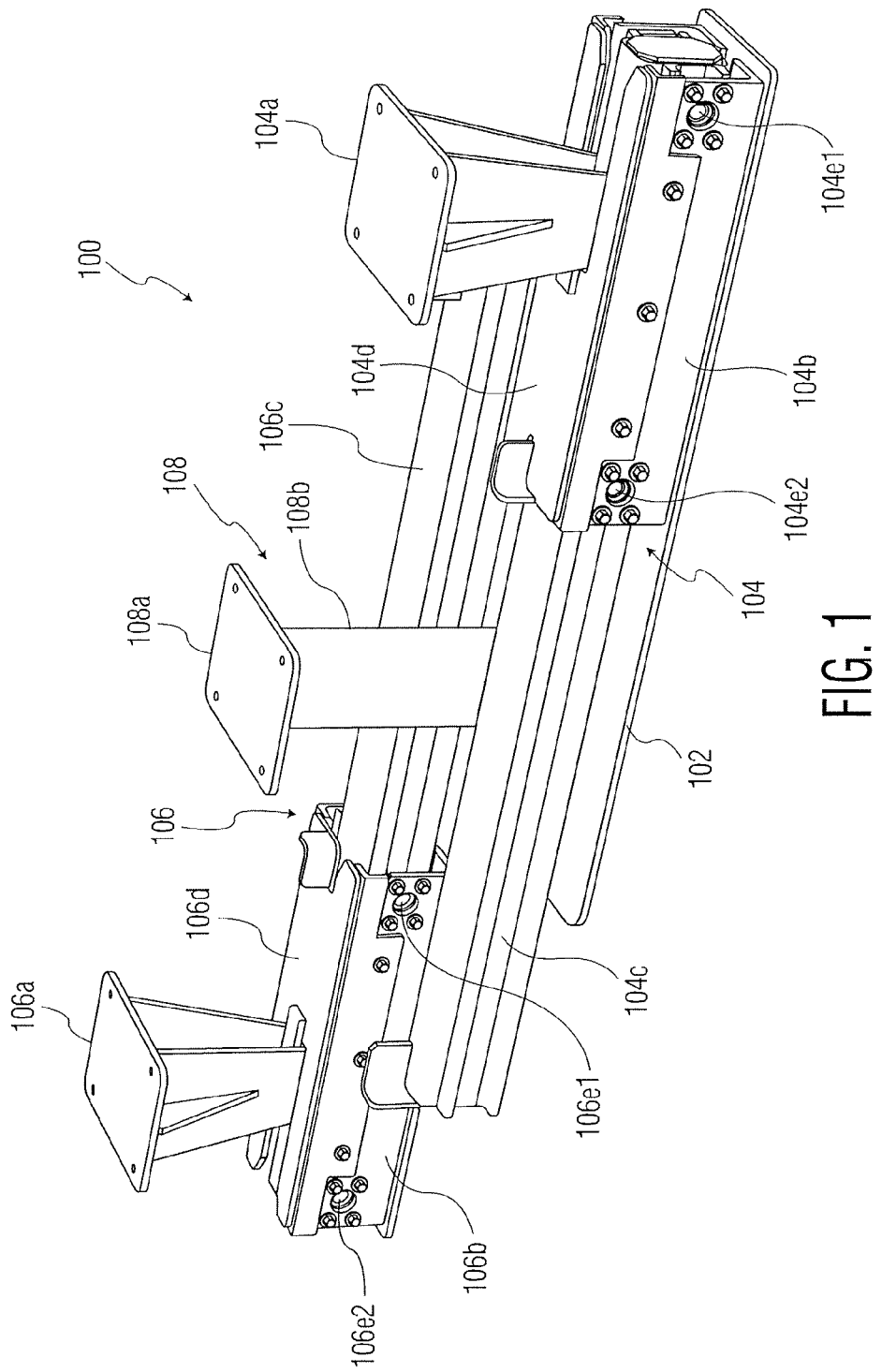
FIG. 1 is a perspective view of a multi-phase electrical substrate racking mechanism in a retracted configuration in accordance with an exemplary embodiment of the present invention.

The present invention relates to various improvements in mobile electrical substation racking mechanisms. In certain exemplary embodiments of the present invention, a moveable structural member defines a groove/channel at each side thereof. Bearing(s) are disposed between the moveable structure member and the fixed structural member on either side of the moveable structure member. As the moveable structural member moves between the transport mode and the operational mode, the bearings ride within the groove/channel disposed at each side of the moveable member, as shown in FIGS. 1-9.

As provided above, the bearing(s) between the fixed and movable structural members may be located at the side(s) of each of the movable structural members. The bearings can be attached to the movable or fixed structural members, with the opposite part being shaped to carry the forces and guide the movable structural member in the desired direction. The bearings can be attached to the structural member directly, or a separate component like a back plate. The attachment to a back plate (as shown throughout the drawings) enables a simpler mounting to the structural member.

The fixed structural member may include various different parts, depending on the specific configuration. The configuration is influenced by the bearing arrangement. A bearing arrangement can be to one or both sides of the movable structural member (see FIGS. 1-9, where bearings are shown on both sides of the moveable structural member). A protective, stabilizing protective cover (as shown in the drawings) can be employed if the fixed structural member consists of multiple parts.

By employing the inventive racking mechanism of the present invention, the height of the racking mechanism may desirably be kept lower, enabling more spacing for the mobile components achieving higher kV and MVA. Further, the weight of the racking mechanism can be kept lower, as an all steel construction can be used. Further still, the mechanism is more robust, employing less movable parts—and the mechanism is better suited for manufacturing.

Although the present invention has been illustrated primarily with respect to a channel/groove on the moveable structural member (as in FIGS. 1-9), the present invention is not limited thereto. For example, the groove/channel may be arranged on the fixed structural member (e.g., with bearings coupled to the moveable structural member, either directly or indirectly).

Likewise, although the present invention is illustrated primarily with respect to channels/grooves on each side of the moveable structural member (with corresponding bearing(s) on each side of the moveable structural member for engagement with the channels/grooves), the present invention is not limited thereto. For example, in certain arrangements a single channel/groove (and corresponding bearing(s)) may support the motion of the moveable structural member between the transport mode and the operational mode.

As illustrated in the drawings provided herein, certain moveable structural members of the present invention may be used to move switchgear components related to a phase of three-phase electrical system. That is, one moveable structural member (and corresponding fixed structural member(s) and bearing(s)) may be used to move a portion of given phase of a three-phase electrical system. In the illustrated embodiments, such as in FIG. 8: (a) one such moveable structural member is used to move a first phase on a first end, and another such moveable structural member is used to move the first phase on a second end (opposite from the first end); (b) two stationary members may be used to support a second (middle) phase of the three-phase electrical system; (c) one such moveable structural member is used to move a third phase on a first end, and another such moveable structural member is used to move the third phase on a second end (opposite from the first end).

While the present invention may often be used in connection with movement of switchgear components on the high voltage side of the mobile electrical substation, it is not limited thereto.

Referring now to FIGS. 1-6, a portable electrical substation racking system 100 is shown. Each system 100 includes a first racking mechanism 104 including a mounting platform 104a, a fixed structural member 104b, a moveable structural member 104c, and a protective cover 104d (covering elements of fixed member 104b including bearing elements 104e1, 104e2, 104e3, 104e4, etc.). As shown throughout the drawings, bearing elements 104e1, 104e2, 104e3, 104e4, are secured to one of the two sides of fixed structural member 104b, for example, using back plates and fasteners (such as screws or bolts). Moveable structural member 104c defines channels 104c1, 104c2 on opposite sides from one another. During movement of moveable structural member 104c, channels 104c1 and 104c2 ride along the bearings.

Each system 100 also includes a second racking mechanism 106 including a mounting platform 106a, a fixed structural member 106b, a moveable structural member 106c, and a protective cover 106d (covering elements of fixed member 106b including bearing elements 106e1, 106e2, 106e3, 106e4, etc.). As shown throughout the drawings, bearing elements 106e1, 106e2, 106e3, 106e4, are secured to a one of the two sides of fixed structural member 106b, for example, using a back plate and fasteners (such as screws or bolts). Moveable structural member 106c defines channels 106c1, 106c2 on opposite sides from one another. During movement of moveable structural member 106c, channels 106c1 and 106c2 ride along the bearings.

Each system 100 also includes stationary support structure 108 including a support post 108b attached to an assembly base 102, and a mounting platform 108a on top of the post 108b. Assembly base 102 acts as a base support structure for fixed structural member 104b and fixed structural member 106b.

Figure 2:
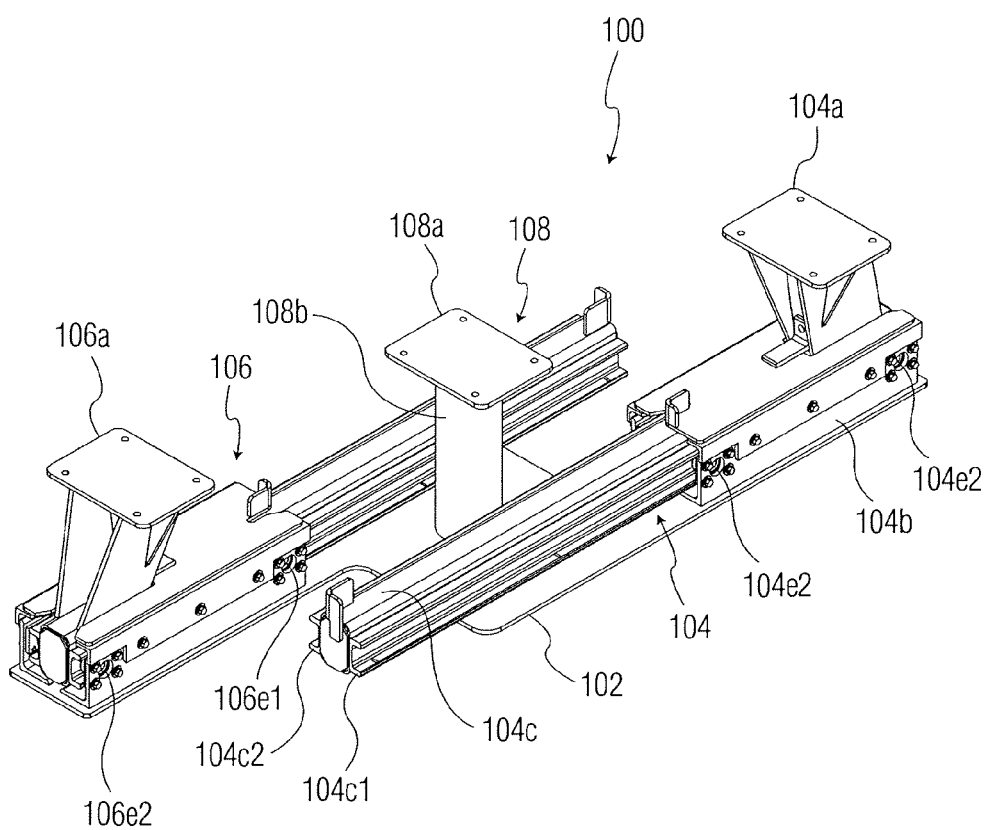
FIG. 2 is another perspective view of the multi-phase electrical substrate racking mechanism of FIG. 1 in the retracted configuration.
Figure 3:
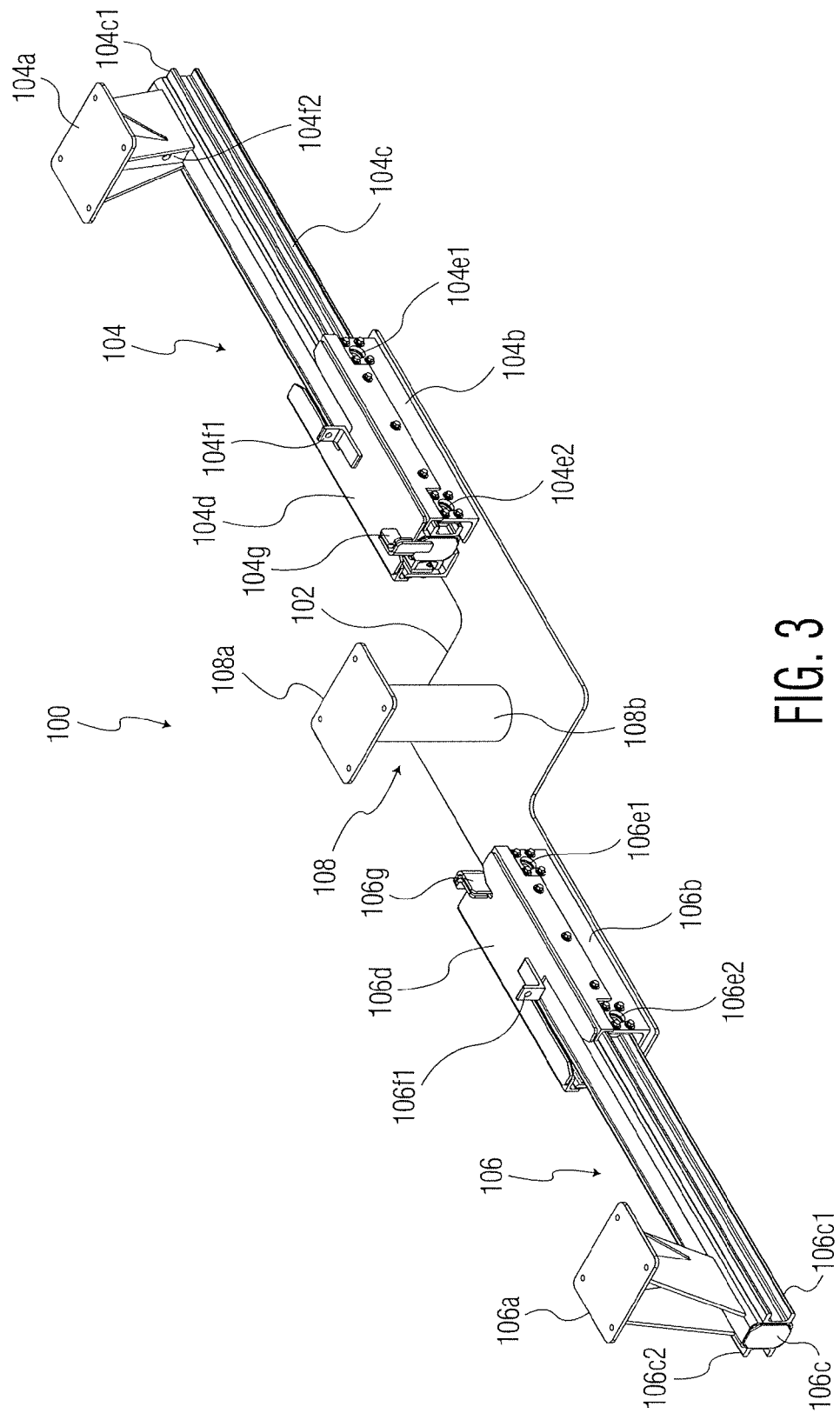
FIG. 3 is another perspective view of the multi-phase electrical substrate racking mechanism of FIG. 1 in an extended configuration.
Figure 4:
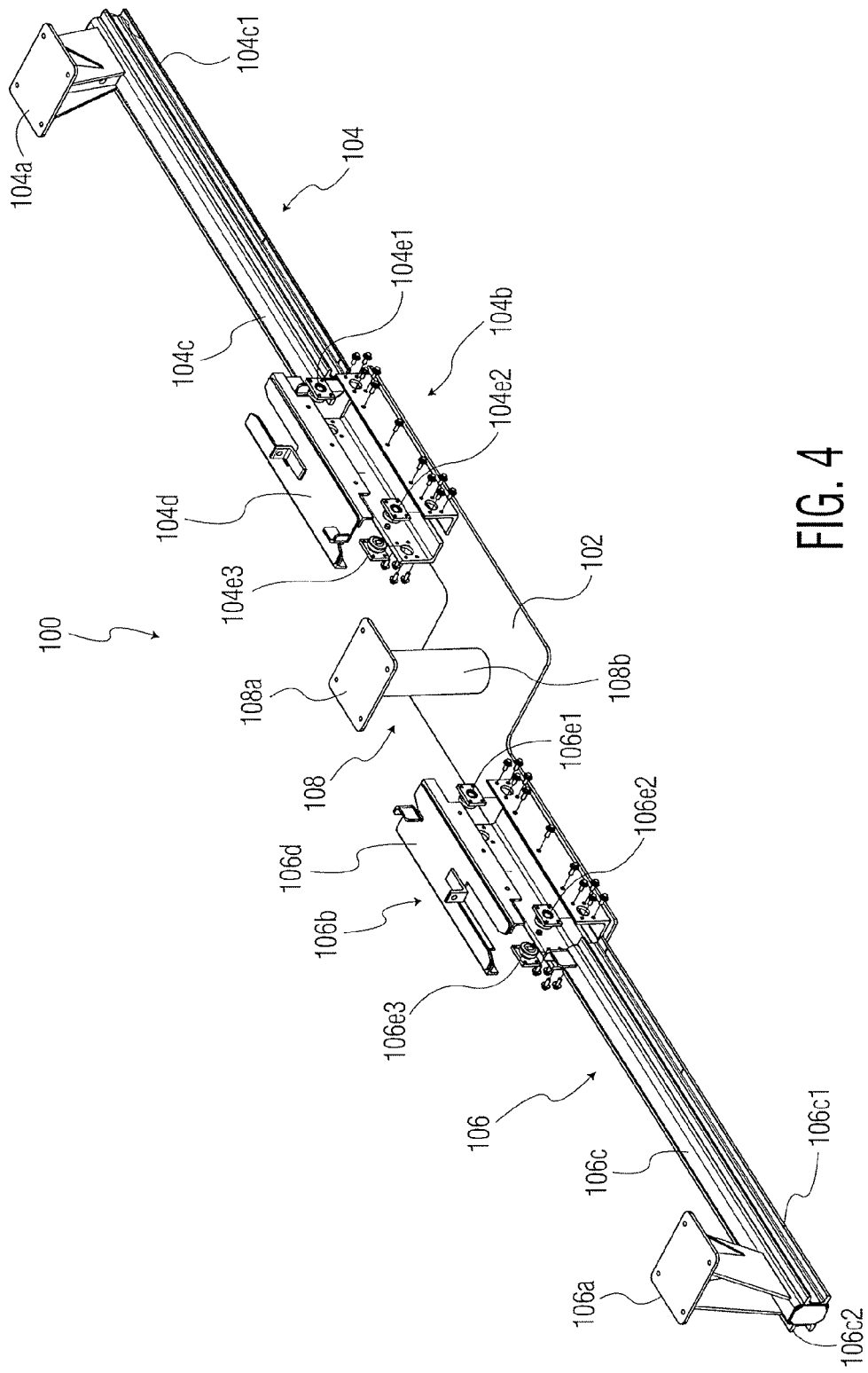
FIG. 4 is an exploded perspective view of the multi-phase electrical substrate racking mechanism of FIG. 1 in an extended configuration.

FIGS. 1-2 illustrate system 100 in a retracted position (i.e., in a transport mode). FIG. 3 illustrates system 100 in an extended position (i.e., in an operational mode, providing the desired clearance between electrical components of the electrical switchgear supported by system 100). FIG. 4 illustrates system 100 in the extended position, but in an exploded view. FIGS. 3-4 illustrate a locking mechanism including locking tab 104f1 (defining an aperture as shown in FIG. 3) on fixed structural member 104b, and a corresponding aperture 104f2 on moveable structural member 104c. In transport mode (in the retracted position) a lock may be engaged with these two apertures such that the members 104b, 104c do not move with respect to one another during transport. A corresponding locking tab 106f1 is included on fixed structural member 106b (as well as a corresponding aperture on moveable structural member 106c, not visible in FIGS. 3-4). Stops 104g, 106g are provided on each of fixed structural members 104b, 106b, respectively, to limit movement of the respective moveable structural member 104c, 106c during retraction into the transport mode.

Figure 5:
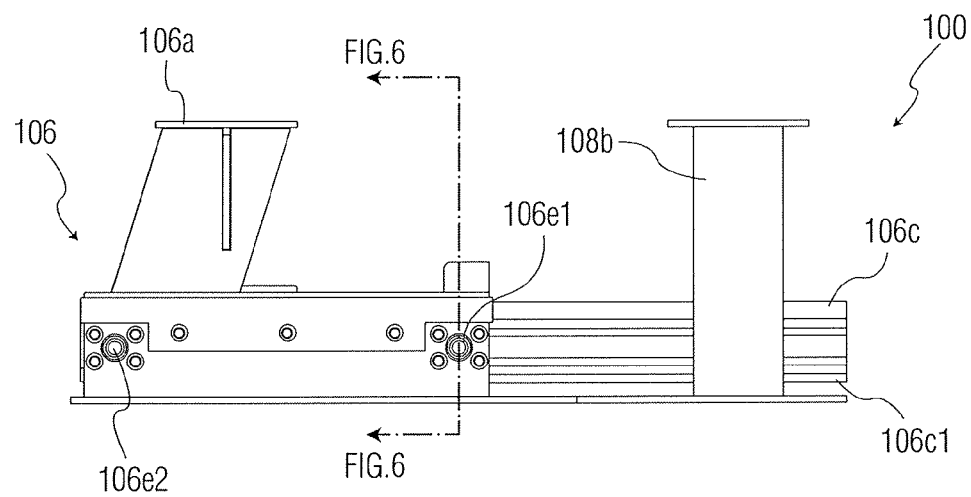
FIG. 5 is a side view of a portion of the multi-phase electrical substrate racking mechanism of FIG. 1.
Figure 6:
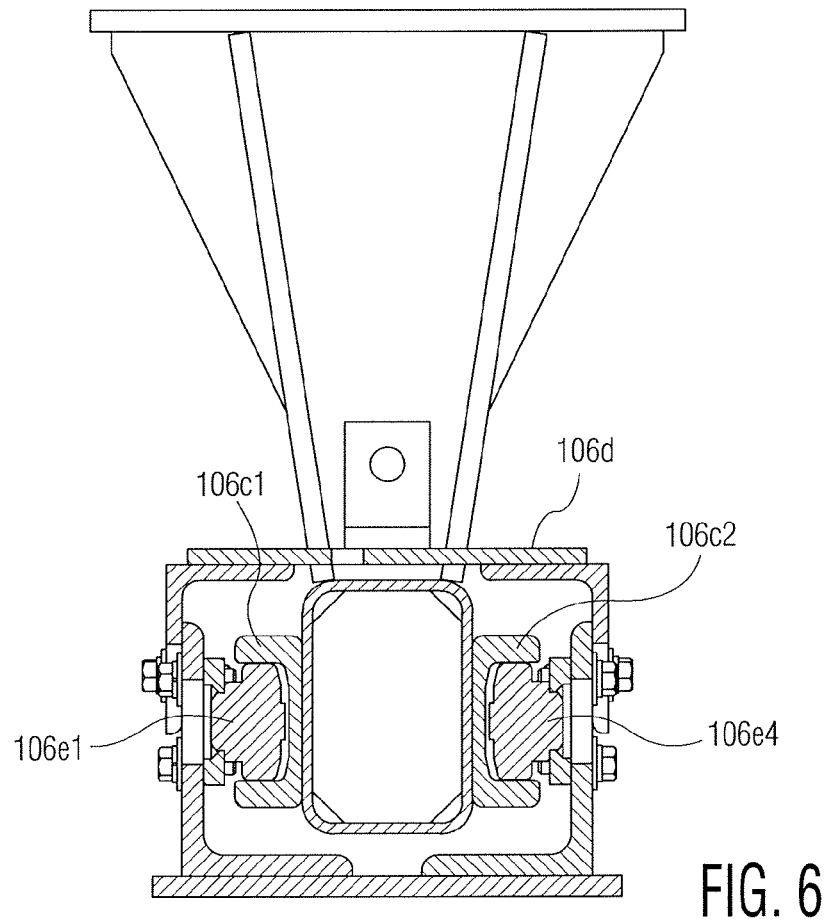
FIG. 6 is a cutaway view of the portion of the multi-phase electrical substrate racking mechanism.

FIGS. 5-6 illustrate details of system 106. For example, each of channels 106c1, 106c2 (which may be considered as linear guide rails for engagement with the respective bearings) are provided on opposite sides of a hollow structural tubing member. Each of systems 104, 106 may have the construction shown in FIGS. 5-6.

Figure 7:
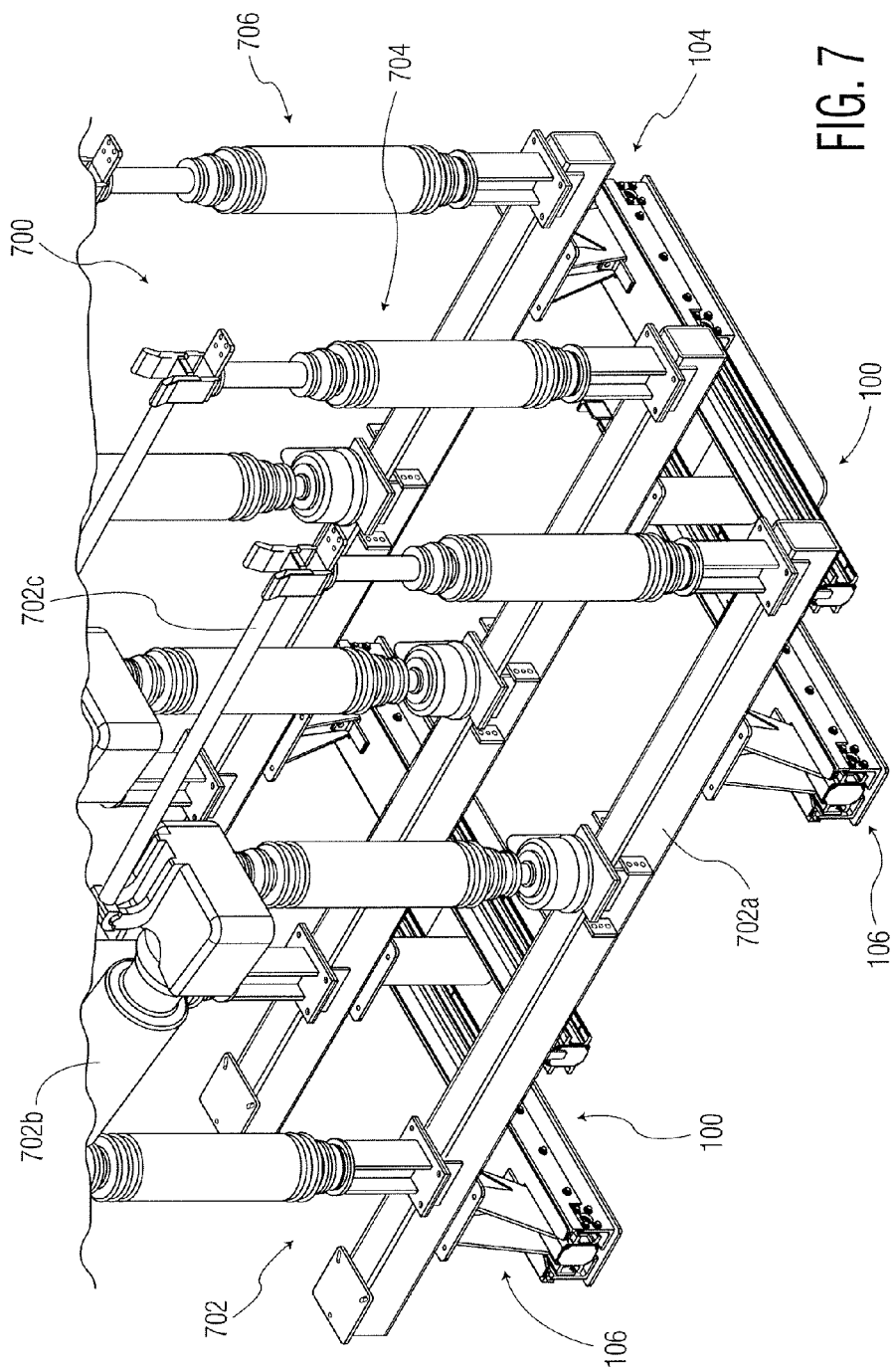
FIG. 7 is a perspective view of three phase electrical switchgear supported by the multi-phase electrical substrate racking mechanism of FIG. 1 in a retracted position.
Figure 8:
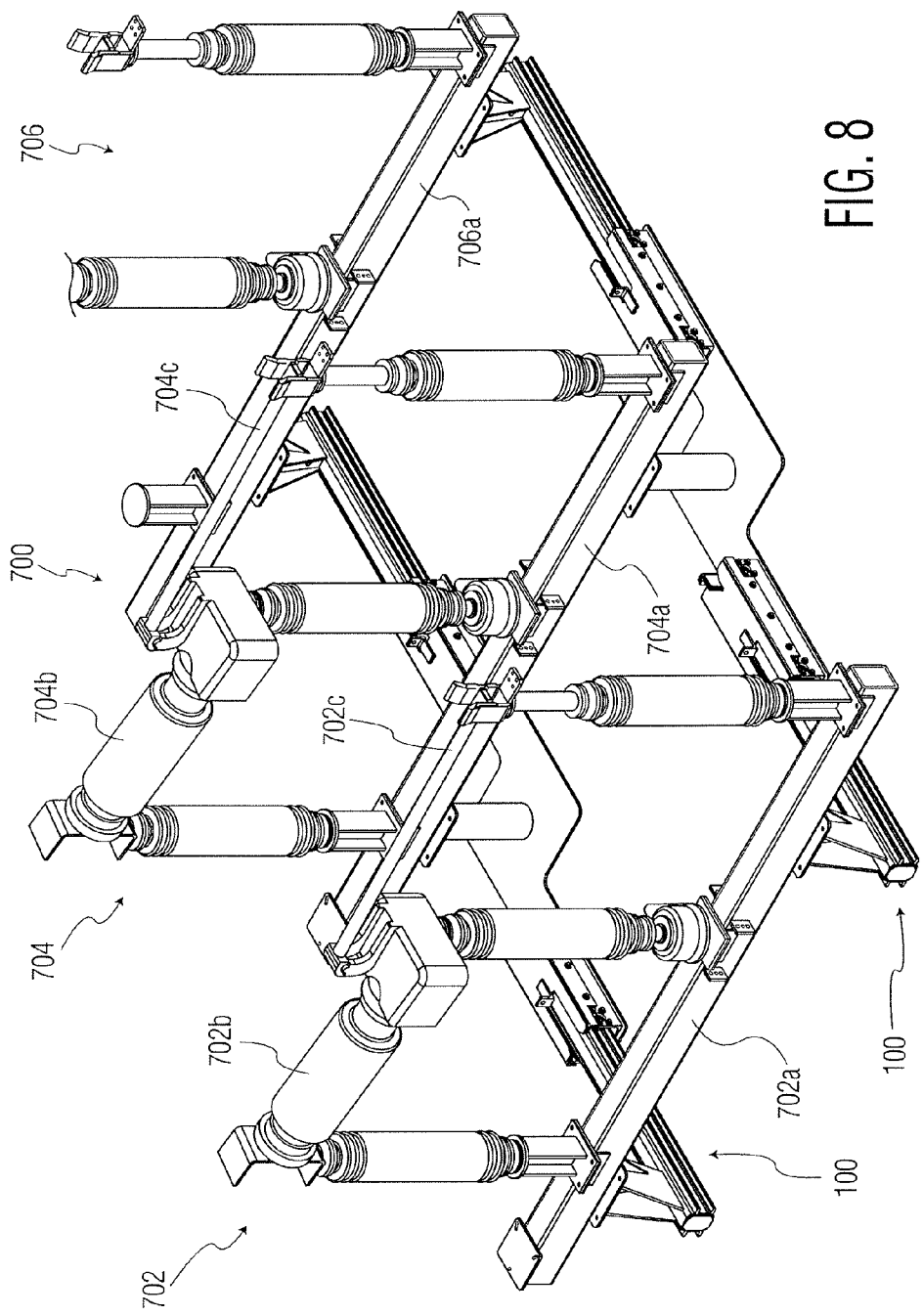
FIG. 8 is a perspective view of three phase electrical switchgear supported by the multi-phase electrical substrate racking mechanism of FIG. 1 in an extended position.
Figure 9:
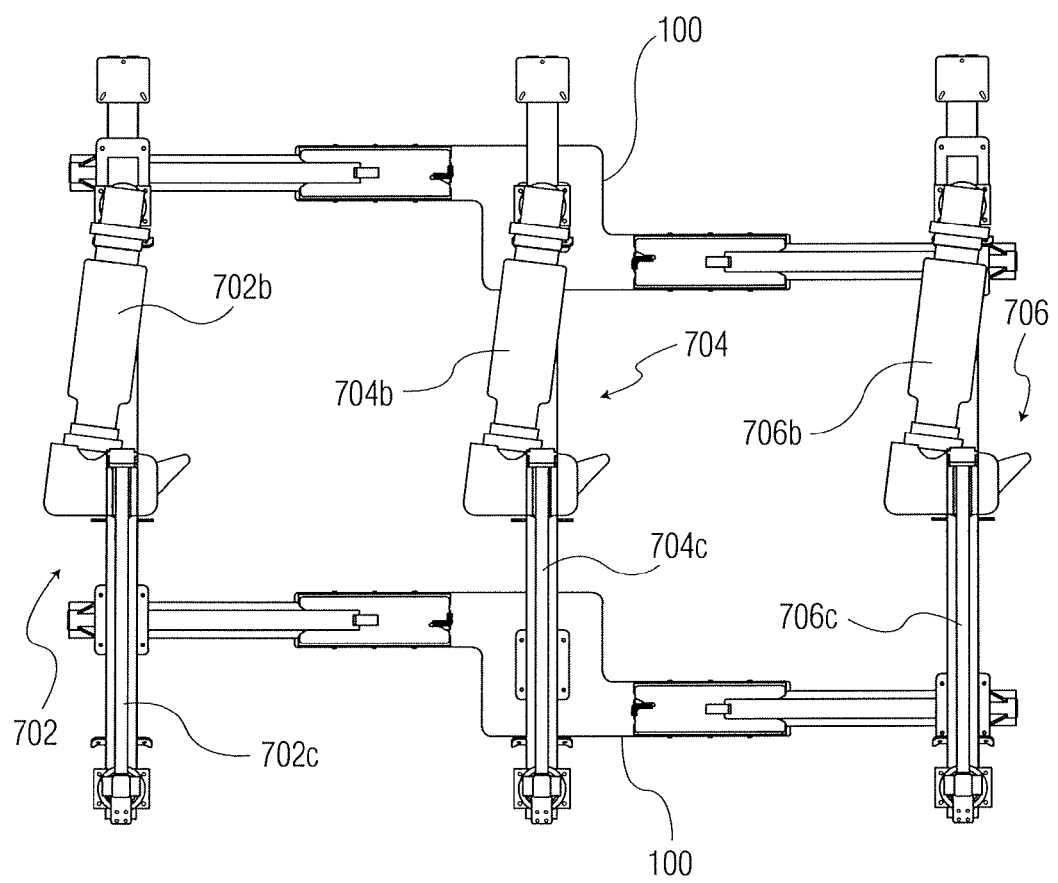
FIG. 9 is a top view of three phase electrical switchgear supported by the multi-phase electrical substrate racking mechanism of FIG. 1 in an extended position.

FIGS. 7-9 illustrate two systems 100 utilized to support three phase electrical switchgear system 700 including a first electrical phase 702, a second electrical phase 704, and a third electrical phase 706. Exemplary elements of phases 702, 704, and 706 include: respective support beams 702a, 704a, and 706a; respective circuit breakers 702b, 704b, and 706b; and respective knife switches 702c, 704c, and 706c. Of course, the switchgear includes other elements, not expressly identified. FIG. 7 illustrates systems 100 in a transport mode (retracted position), and FIG. 8 illustrates systems 100 in an operational mode (extended position).

Figure 10:
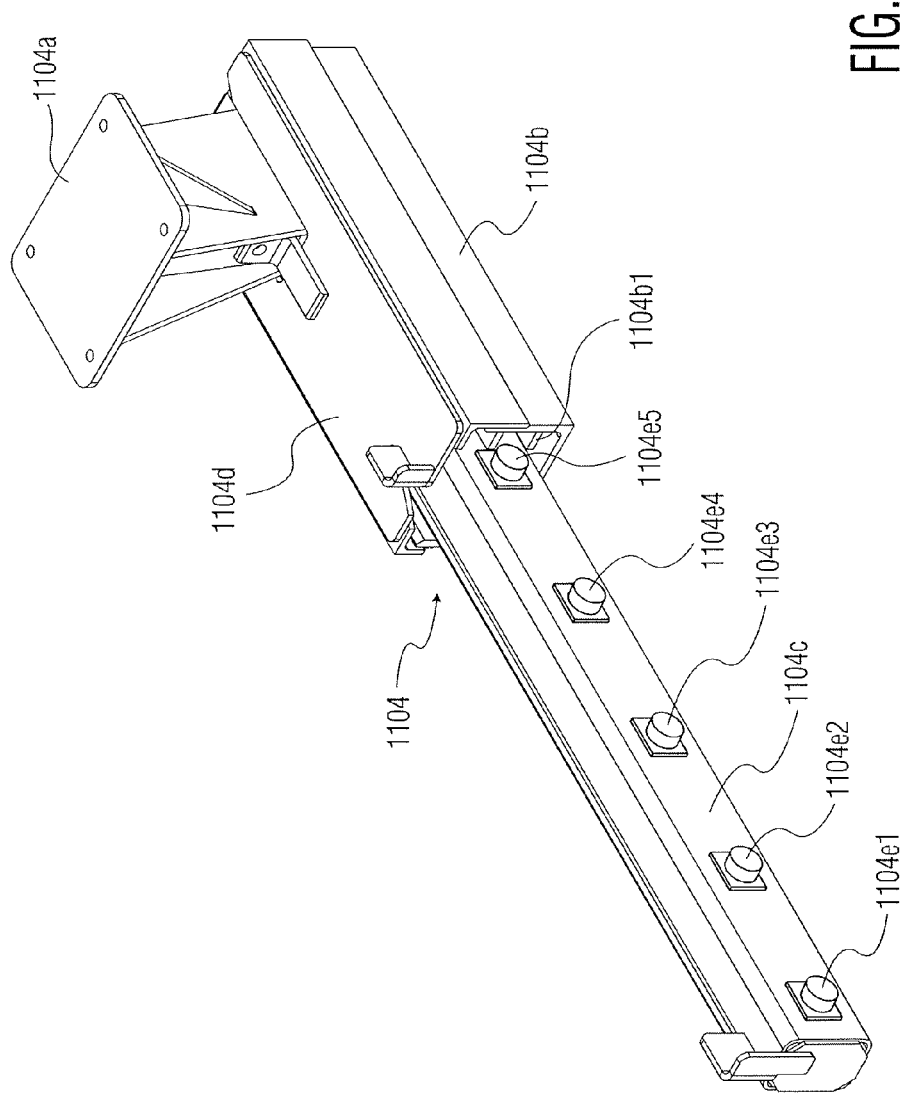
FIG. 10 is a perspective view of a portion of another multi-phase electrical substrate racking mechanism in a retracted configuration in accordance with an exemplary embodiment of the present invention.
Figure 11:
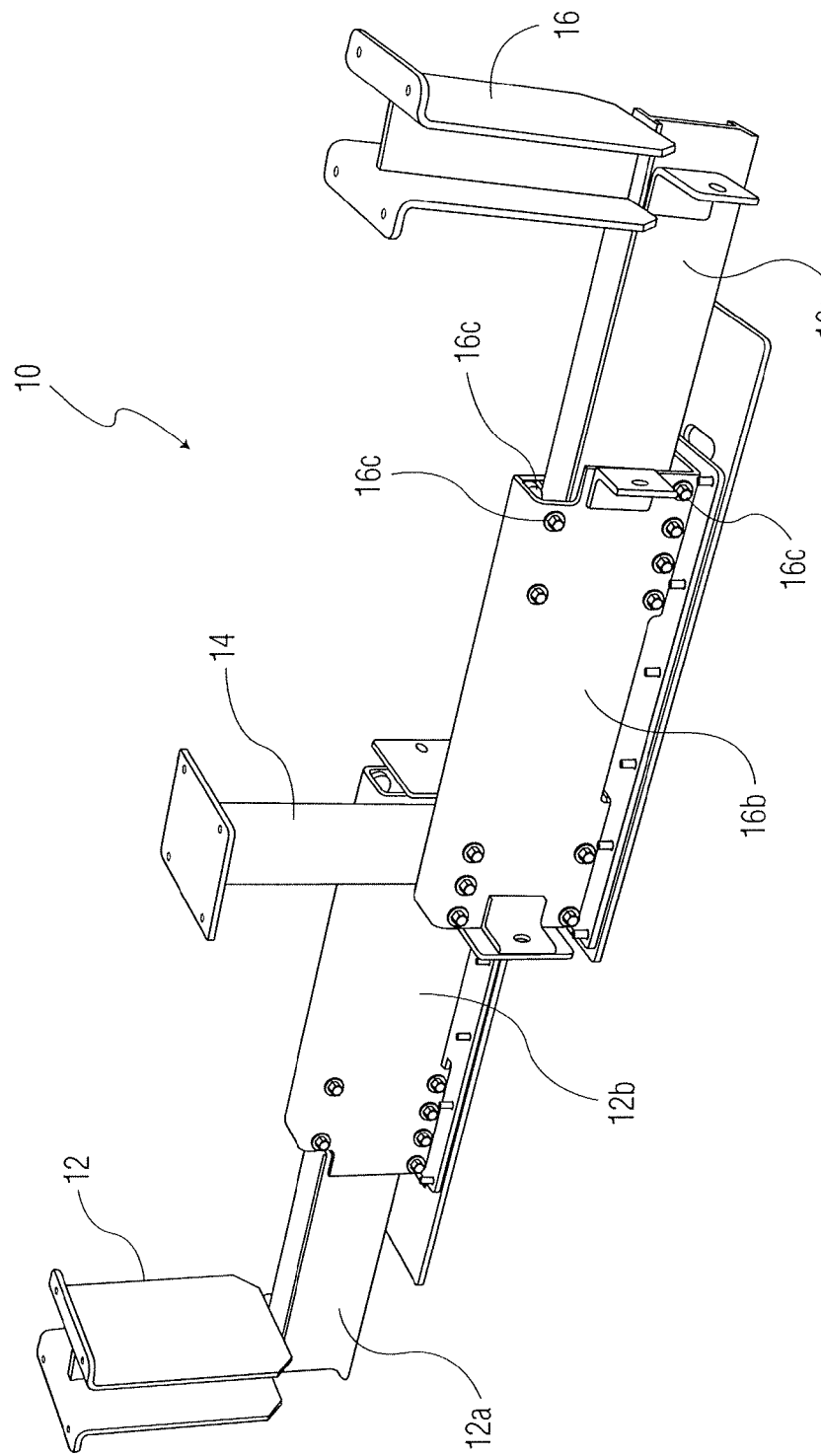
FIG. 11 is a perspective view of a conventional multi-phase electrical substrate racking mechanism.

As provided above, the present invention is not limited to configurations where a channel/groove is provided on a moveable structural member, and the bearings are provided on the fixed structural member. For example, FIG. 10 illustrates a first racking mechanism 1104 (part of a portable electrical substation racking system similar to the systems 100 shown herein) including a mounting platform 1104a, a fixed structural member 1104b, a moveable structural member 1104c (carrying the mounting platform 1104a), and a protective cover 1104d (covering elements of fixed member 1104b). As shown throughout the drawings, bearings 1104e1, 1104e2, 1104e3, 1104e4, 1104e5 are secured to one or both sides of moveable structural member 1104c. Fixed structural member 1104b defines channel 1104b1 (and perhaps another channel on an opposite side of moveable structural member 1104c for receiving additional bearings during motion). During movement of moveable structural member 1104c, bearings 1104e1, 1104e2, 1104e3, 1104e4, 1104e5 ride along channel 1104b1.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A racking mechanism for moving elements of a mobile electrical substation between a transport mode and an operational mode, the racking mechanism comprising:
   a fixed structural member;
   a moveable structural member;
   a bearing disposed between a side surface of the fixed structural member and a side surface of the moveable structural member; and
   at least one of (i) a locking mechanism for locking the fixed structural member with respect to the moveable structural member, such that when the locking mechanism is locked the fixed structural member does not move with respect to the moveable structural member in the transport mode of the mobile electrical substation, or (ii) a stop element on the fixed structural member for limiting movement of the moveable structural member during retraction of the moveable structural member into the transport mode of the mobile electrical substation.

2. The racking mechanism of claim 1 wherein the moveable structural member defines a channel on a side surface of the moveable structural member configured to be engaged with the bearing.

3. The racking mechanism of claim 2 wherein the bearing is attached to the fixed structural member.

4. The racking mechanism of claim 1 wherein the bearing includes a plurality of bearings, and wherein the moveable structural member defines a first channel on a first side surface of the moveable structural member, and a second channel on a second side surface of the moveable structural member, each of the first channel and the second channel configured to be engaged with at least one of the plurality of bearings.

5. The racking mechanism of claim 1 wherein the fixed structural member defines a channel on a side surface of the fixed structural member configured to be engaged with the bearing.

6. The racking mechanism of claim 5 wherein the bearing is attached to the moveable structural member.

7. The racking mechanism of claim 1 wherein the bearing includes a plurality of bearings, and wherein the fixed structural member defines a first channel on a first side surface of the fixed structural member, and a second channel on a second side surface of the fixed structural member, each of the first channel and the second channel configured to be engaged with at least one of the plurality of bearings.

8. The racking mechanism of claim 1 the bearing includes a plurality of bearings disposed between side surfaces of the fixed structural member and side surfaces of the moveable structural member.

9. The racking mechanism of claim 1 wherein the moveable structural member includes a support platform configured for supporting elements of an electrical switchgear.

10. A multi-phase racking mechanism for moving elements of a multi-phase mobile electrical substation including a plurality of portions of electrical switchgear between a transport mode and an operational mode, the multi-phase racking mechanism comprising:
    a plurality of fixed structural members;
    a plurality of moveable structural members, each of the moveable structural members being engaged with a corresponding one of the fixed structural members; and
    a plurality of bearings disposed between side surfaces of each of the fixed structural members and side surfaces of a corresponding one of the moveable structural members, wherein each of the moveable structural members includes a support platform configured for supporting a respective portion of the electrical switchgear, the multi-phase racking mechanism further comprising a stationary platform configured for supporting another portion of the electrical switchgear, the stationary platform being positioned between the support platforms of the moveable structural members in each of the transport mode and the operational mode.

11. The multi-phase racking mechanism of claim 10 wherein each of the moveable structural members defines a channel on a side surface of the moveable structural member configured to be engaged with at least one of the plurality of bearings.

12. The multi-phase racking mechanism of claim 11 wherein the plurality of bearings are attached to ones of the plurality of fixed structural members.

13. The multi-phase racking mechanism of claim 10 each of the plurality of moveable structural members defines a first channel on a first side surface of the moveable structural member, and a second channel on a second side surface of the moveable structural member, each of the first channel and the second channel configured to be engaged with at least one of the plurality of bearings.

14. The multi-phase racking mechanism of claim 10 wherein each of the plurality of fixed structural members defines a channel on a side surface of the fixed structural member configured to be engaged with at least one of the plurality of bearings.

15. The multi-phase racking mechanism of claim 14 wherein the bearing is attached to the moveable structural member.

16. The multi-phase racking mechanism of claim 10 wherein each of the plurality of fixed structural members defines a first channel on a first side surface of the fixed structural member, and a second channel on a second side surface of the fixed structural member, each of the first channel and the second channel configured to be engaged with at least one of the plurality of bearings.

17. The multi-phase racking mechanism of claim 10 further comprising the electrical switchgear supported by at least one of the plurality of fixed structural members and the plurality of moveable structural members.

18. The multi-phase racking mechanism of claim 17 wherein the electrical switchgear includes circuit breaker devices.

* * * * *